2,928,802
CYCLODIENE CHLOROSILANE MODIFIED MINERAL PIGMENT, POLYMER COMPOSITION CONTAINING SAME, AND METHOD OF MAKING

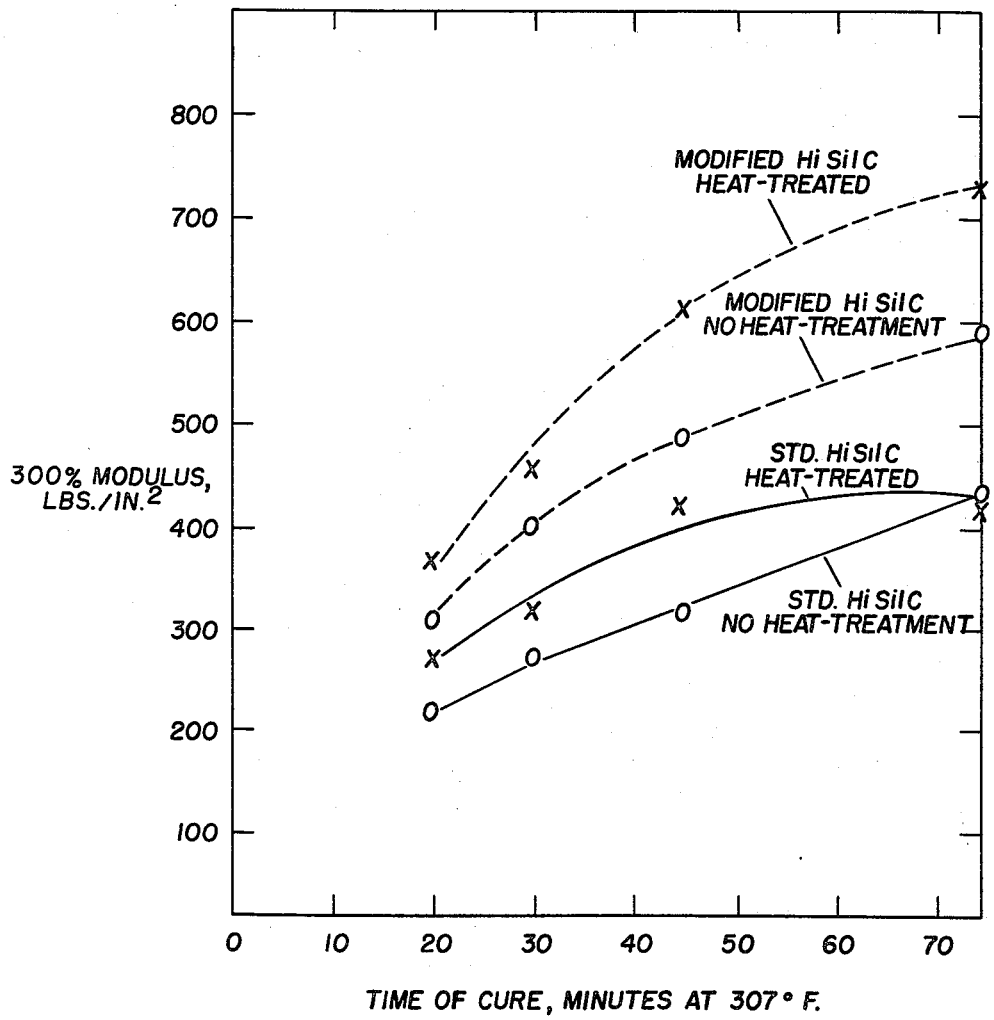
STRESS PROPERTIES OF BUTYL RUBBER COMPOUNDS CONTAINING STANDARD AND CPD $SiCl_3$-MODIFIED HiSilC FILLER BEFORE AND AFTER HOT MILLING
John Rehner, Jr.
Herbert K. Wiese
Albert M. Gessler

John Rehner, Jr., Westfield, Herbert K. Wiese, and Albert M. Gessler, Cranford, N.J., assignors to Esso Research and Engineering Company, a corporation of Delaware Application December 1, 1955, Serial No. 550,251

19 Claims. (Cl. 260—41.5)

This invention relates to a novel method of treating mineral pigments and fillers such as hydrated silicas and aluminas in order to modify them so the resulting fillers will have improved reinforcing properties when compounded into rubber, resins, paints, inks, etc. or other pigmented compositions.

Heretofore, some hydrated silicas and other materials have been reacted with some organic-substituted chlorosilanes in order to give them modified properties. For instance, vinyl- and cyclohexenyl trichlorosilane have been used as such treating agents, and have accomplished certain effects in modifying the properties of the treated silicas.

However, it has now been found, according to the present invention, that not only unexpectedly superior results but also in some instances entirely different kinds of results, may be obtained by treating the hydrated silicas, clays, aluminas, etc. with a new and different type of organic halosilane. The treating agent used is one having the general formula $$R_mSi_nX_{2n+2-m}$$

where R is a cycloalkadienyl radical, $m = 1$ to $2n+1$, and X is a halogen having an atomic weight at least as high as that of chlorine, and $n = 1$ to 5 or somewhat higher. The preferred organo halosilane to be used is one having the general formula $$R_mSiX_{4-m}$$

where $m = 1$ to 3, as in the formulae $RSiCl_3$, $R_2SiCl_2$, $R_3SiCl$, etc., or mixtures thereof. The radical R is preferably a cyclopentadienyl radical $C_5H_5$—. R may also be the corresponding methyl cyclopentadienyl radical, or may be one of the corresponding cyclohexadienyl radicals. A preferred specific treating agent is cyclopentadienyl trichlorosilane, which has the graphic formula:

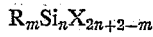

or generically

$(C_5H_5)$

One may also use:

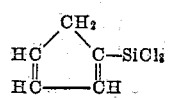

or

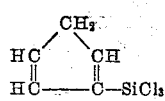

Commercially prepared cyclopentadienyl trichlorosilane is probably a mixture of two or all three of these specific isomers, unless purposely separated. It is also possible to use other lower alkyl derivatives of these pentadienyl-type materials, as well as corresponding radicals derived from the cyclopentadiene dimer. The actual chemical preparation of these cyclopentadienyl halosilanes is not part of the present invention, but has been described in application Serial No. 367,758, filed July 13, 1953, by Weise et al., the disclosures of which are incorporated herein by reference.

According to the present invention, the above-described cycloalkadienyl halosilanes are reacted with suitable halosilane-reactive mineral pigments or fillers. Such pigment is preferably selected from the group consisting of at least partially hydrated silicas, aluminas, calcium silicates, and clays.

The mineral fillers to be used may be selected from a fairly wide variety of inorganic mineral products either consisting of or containing large amounts of silica alumina or other oxides or hydrated or partially hydrated derivatives thereof, or naturally occurring mineral deposits or synthetic material containing such substances along with other inorganic elements or compounds, for instance, in addition to using finely divided silicas and aluminas per se, such as examples of various mineral fillers that may be used including the following:

Aluminum silicate
Hydrous alumina silicate
Precipitated calcium carbonate
Basic alumina sulfate
Aluminum hydroxide, bauxite
Kaolin
Magnesium carbonate
Precipitated magnesium carbonate
Various clays (various $SiO_2$—$Al_2O_3$ ratios)
Precipitated hydrated calcium silicate
Titanium dioxide
Hydrated silica These various mineral fillers should be finely divided powders, 99% passing a 325 mesh screen, down to as fine as 0.01–0.02 micron particle size.

The proportions of mineral filler and silane (i.e., the organo halosilane) to be used will vary according to the particular kind of each of these materials which is being used. Normally, however, the amount of the silane should be about 1 to 15% by weight, preferably about 3 to 10% by weight, based on the amount of the hydrated mineral filler or pigment.

The treatment or modification of the pigment with the silane may be carried out in various ways. One suitable method is to dissolve the silane, as, for instance, cyclopentadienyl trichlorosilane in an inert solvent such as either an inert hydrocarbon liquid, e.g., paraffinic or naphthenic hydrocarbons, e.g., normal hexane or heptane, cyclohexane, a refined kerosene fraction, etc., or an inert aromatic hydrocarbon solvent, e.g., benzene, toluene, xylene, or a mixed petroleum aromatic fraction such as "Solvesso," having a boiling range of about 200 to 275° F., or inert halogenated organic solvents such as carbon tetrachloride, tetrachlorethane, o-dichlorbenzene, etc. Then the pigment to be treated is added, preferably gradually, to the resulting solution, at the desired reaction temperature which may be about 0 to 150° C., preferably about 20 to 60° C., with suitable agitation and with provision for removal or disposal of hydrogen chloride because it may be given off during the reaction. The resulting slurry should be stirred until the reaction is apparently complete.

This reaction is violent at first and probably takes place immediately by utilizing free water held on the pigment. The probable reaction may be represented by the following general equation:

For instance, when Hi Sil, which is a fine particle hydrated silica dioxide, is added to a hexane solution of cyclopentadienyl trichlorosilane (abbreviated "CPD-TCS"), an effervescence is developed and HCl is evolved. Following this, there is a continued reaction during which the silica undergoes a color change, usually to a deep green or blue-green. The latter reaction which is slower is also accompanied by the evolution of HCl, and is presumed to involve a further condensation of the silane with bound water or hydroxyl ions attached to the surface of the silica particles. This part of the reaction may be represented by the following equation:

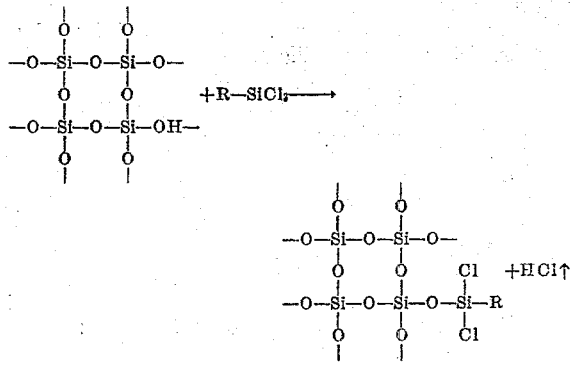

After the reaction has completely subsided or been completed to the desired extent, the solvents may be evaporated off from the treated pigment, and the latter may be dried by any suitable means such as by air drying at 25 to 100° C. or by drying in a vacuum oven at about 25 to 80° C. The color either disappears completely or is greatly reduced in the dried treated pigment product, and therefore no difficulty is encountered in subsequent use of such product in making compounded white rubber mixtures.

The cyclodiene-halosilane-modified hydrated pigments made as thus described above are useful for many different purposes, chief of which is for compounding with various liquid to solid base stocks, preferably unsaturated, which may be of a number of different types including rubbers, resins, plastics, paints, inks, etc. Examples of plastifiable solid base stocks which may be used include natural rubber or various synthetic rubbers, especially butyl rubber which is a low unsaturation olefin-multi olefin synthetic rubber, or higher unsaturation synthetic rubbers such as GRS (butadiene-styrene) polychloroprene, dienenitrile rubber, etc., or unsaturated resins such as high styrene-low diene resins, or tripolymers such as one containing 30 to 50% by weight of styrene, 1 to 10% of diolefin, and balance of mono-olefins such as isobutylene. Saturated resins with which the modified pigments may be compounded, though without ability to form bonded pigment-resin particles, include polystyrene, polyethylene, polyvinyl chloride, styrene-isobutylene copolymers, and various other synthetic or natural resins. If desired, the halosilane may be reacted with the mineral filler directly during the compounding with rubber, resin or other material, though the hydrogen chloride liberated tends to cause some corrosion of metal equipment.

Butyl rubber is a synthetic high molecular rubbery copolymer of about 0.1 to 15% by weight of a multi-olefin of 4 to 14, preferably 4 to 6 or 8 carbon atoms, with a mono-olefin of 4 to 8 carbon atoms, preferably an iso-olefin of 4 to 5 carbon atoms. These rubbery copolymers may be made as described in U.S. Patent 2,356,128, and in the book by Whitby on "Synthetic Rubber," 1954, chapter 24, namely by copolymerization at temperatures below 0° C., preferably between about —50° C. and —165° C., preferably in the presence of about 1 to 20 volumes of inert diluent such as methyl-, or ethyl chloride, butane, heptane, etc., and in the presence of a small amount of dissolved Friedel-Crafts catalyst, e.g. $AlCl_3$, $BF_3$, $TiCl_4$, etc., dissolved in methyl chloride or ethyl chloride, or $AlBr_3$ dissolved in heptane, etc. The resulting high molecular weight copolymer should have a Staudinger molecular weight of about 20,000 to 100,000 or more, corresponding to a viscosity average molecular weight of about 130,000 to 2,000,000, and should have a Mooney value (8 minutes at 212° F.) of about 30 to 90, preferably about 40 to 70, with a relatively low mole percent unsaturation of about 0.1 to 15%, or an iodine number (Wijs) of about 0.5 to 50. These copolymers, which have been manufactured commercially for a number of years under the Government designation GRI, are vulcanizable and may be cured either with some sulfur and older accelerators such as tetramethyl thiuram disulfide, mercaptobenzoyl thiazole, etc., or with non-sulfur curing agents such as paranitrosobenzene, paraquinonedioxime, or its derivatives, etc.

The above described Butyl rubber is very different in many respects from natural rubber which has an iodine number of about 350, and various high unsaturation synthetic rubbers such as GRS (butadiene-styrene emulsion copolymer), butadiene-acrylonitrile synthetic rubber, polychloroprene, and others which have iodine numbers ranging from about 200 to 350.

The proportions in which these modified pigments should be used will, of course, vary with the type of base stock and the intended use, but normally should be within the range from about 1 to about 150, preferably about 10 to 100 parts by weight per 100 parts of the liquid to solid base stock.

When the modified pigments are compounded with base stocks which are unsaturated the resultant composition is subject to further improvement by heat treatment applied to the mixture of modified pigment and Butyl rubber which may be carried out in several ways, namely, by hot milling, which is the preferred method, or by static heating followed by mastication, or by alternate cycles of static heating, e.g. for 15 minutes to an hour followed by a few minutes, e.g. 1 to 10 minutes, preferably about 3 to 5 minutes of milling or mastication. Such cycles may be repeated as often as desired, e.g. 5 to 20 times, preferably about 6 to 10 or 12 times.

The temperature to be used may vary according to the type of heat-treatment being used and, of course, according to the duration of heat-treatment. Generally, the temperature of the heat treatment should be from 250° to 450° F., preferably from 300° to 400° F., for a period of time ranging inversely according to the temperature, from about one hour to eight hours at 250° F. with static heating, to as short a time as 5 to 30 minutes at 350–450° F. with hot milling, Banburying or other dynamic heating. Intermediate combinations of temperature time and amount of mastication or working may be used. In general, the time of heating (in hours) may be expressed by the formula:

$$\text{Hours} = \frac{K}{T - 200}$$

where T is the temperature in ° F., and K is a constant of 15 to 600, preferably 40 to 550. Preferably, for static heating, K should be 200–550, and for dynamic heating, about 15 to 150.

Even in the case of static heating the heat-treatment must be followed by a final mastication to insure a homogeneous plastic composition which, either with or without the further addition of curing agents, anti-oxidants, stabilizing agents, coloring agents, etc., may then be finally extruded into tubes, rods, etc., or calendered into sheets or films, or molded into the desired final shapes, with subsequent curing if the composition is unsaturated and has curing agents admixed therewith.

Although the mechanism of the operation of the invention is not known or understood in all respects, it is believed that one theory for the observed advantages of the present invention, which may particularly explain the superior properties obtained after extended aging of the compositions produced according to the invention, is that the cyclodiene radicals attached to the modified pigments are preferentially attacked by the oxygen coming in contact with the compositions, and that these cyclodiene ring structures break open without causing or permitting a break in the bond between the modified pigment and the unsaturated material with which it had been compounded and heat-treated, for instance, Butyl rubber. On the other hand, when other types of hydrocarbon-halosilane modified pigments have been made by prior art processes, the hydrocarbon radicals used were of such types as to be susceptible to oxidation of a type permitting breaking of the bond between the modified pigment and the rubber or other material with which it had been compounded.

The objection and advantages of the invention will be better understood from consideration of the following experimental data.

EXAMPLE I

Hi Sil C, hydrated silicon dioxide of fine particle size (25 millimicrons) has been treated with cyclopentadienyl trichlorosilane and this product, along with standard (unmodified) Hi Sil C has been studied in natural and synthetic rubbers.

Standard Hi Sil C is hydroscopic. In conventional cyclic heat-treatment with open steam, its compounds absorb water so rapidly that they cannot be handled after only a few cycles. Treated Hi Sil C compounds absorb water much less rapidly and, whereas they can be cyclically heat-treated, it is believed that hydrolysis of the trichlorosilane groupings leads to undesirable results. Static heating in air or dynamic heating on a mill or in the Banbury are suitable methods for carrying out thermal interaction with these compounds.

Hi Sil pigments are very fine particle size, precipitated, hydrated silicas. Their properties are listed below:

|  | Hi Sil C | Hi Sil 202 | Hi Sil 233 |
|---|---|---|---|
| Bulk density | 7±1 lb./cu. ft. | 8 | 10 lbs./cu. ft. |
| Specific gravity | 1.95 | 1.95 | 1.95. |
| Average particle size | 25 millimicrons | 22 | 22. |
| Moisture | 4-7% | 5 | 5%. |
| pH | 8-9 | 7.5 | 7.3. |
| Refractive index | 1.44 | 1.46 | 1.46. |
| Ignition loss | 14% max. | 10 | 10%. |
| $SiO_2$ | 86% | 84 | 87. |
| CaO | 3.0% | 1.0 | 0.5. |
| NaCl | 2.0% max. | 1.0 | 1.0. |
| $Fe_2O_3$ | 0.3% max. | 0.3 | 0.2. |
| $Al_2O_3$ | 0.3% max. | 4.0 | 0.6. |

Hi Sil C was surface-treated with cyclopentadienyl trichlorosilane which was prepared in benzene solution by the following reaction:

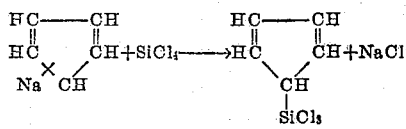

A portion of the product (6.8 gms) was dissolved in 2 liters of n-hexane and this solution was then poured over 200 gms. of Hi Sil C. The filter was hand-stirred in the liquid intermittently for 2 to 3 hours, after which time the n-hexane was allowed to evaporate at room temperature.

BUTYL FORMULATION

GR-I-17 _____ 100.0.
Filler _____ 40.0 masterbatch.
BxDC [1] _____ 2.0.
Zinc oxide _____ 5.0.
Sulfur _____ 2.0 vulcanizing agents.
Tellurac [2] _____ 1.0.
B.J.F. [3] _____ 1.0.

[1] Butoxyethyl diglycol carbonate.
[2] Tellurium diethyl dithiocarbamate.
[3] 3-anilinomethyl-2 (3)-benzothiazolethione.

Vulcanizing agents were added and the compounds were cured over a range of times at 307° F. Table I shows the stress properties of these vulcanizates.

Table I.—Stress properties of butyl compounds containing standard and CPD $SiCl_3$-modified Hi Sil C filler

| Test No. | Standard Hi Sil C 1 | CPD $SiCl_3$-modified Hi Sil C 2 |
|---|---|---|
| A. 300% Modulus, lbs./in.² compound cured at 307° F. (minutes): | | |
| 20 | 215 | 310 |
| 30 | 270 | 400 |
| 45 | 315 | 490 |
| 75 | 435 | 590 |
| B. Tensile strength, lbs./in.² compound cured at 307° F. (minutes): | | |
| 20 | 2,985 | 3,440 |
| 30 | 2,980 | 3,425 |
| 45 | 2,925 | 3,360 |
| 75 | 2,955 | 3,210 |

Modulus is increased 46% (on the average) and tensile strength is increased 400–500 lbs./in.² when cyclopentadienyl trichlorosilane treated Hi Sil C is substituted for standard Hi Sil C in a conventionally mixed butyl compound. Normal Hi Sil C compounds cannot be cyclically heat-treated with live steam because unmodified Hi Sil C is hygroscopic; and trichlorosilane groups on modified Hi Sil C may be hydrolyzed or polymerized in the presence of water.

EXAMPLE II

The Example I described above was repeated in every detail except that half of each masterbatch was subjected to thermal interaction in the form of milling for 40 minutes at 310° F. The attached drawing shows the stress properties of these vulcanizates. Hot milling with unmodified Hi Sil C in butyl leads to some modulus increases. The effect is more pronounced in the early cures, and the similarity of the values at 75 minutes suggests that heat treatment here does little more than accelerate the rate of vulcanization. Modified Hi Sil C systems give greatly increased values of modulus even in the absence of thermal interaction, and after heat treatment, modulus is even further advanced in these compounds, the greatest changes occurring with the longest cures. Thus a significant thermal interaction effect is found and this effect, when added to the improvements realized from using cyclopentadienyl trichlorosilane modified Hi Sil C in conventionally mixed compounds, permits one to almost double the modulus previously obtained in this type of vulcanizate. Tensile strength is likewise enhanced, as is shown by the data in Table II.

Table II.—Tensile properties of butyl-Hi Sil compounds before and after hot milling

TENSILE-ELONGATION 300% MODULUS

| Test No. | No Heat-Treatment | | Heat-Treated [1] | |
|---|---|---|---|---|
| | 1 Standard Hi Sil | 2 Modified Hi Sil | 3 Standard Hi Sil | 4 Modified Hi Sil |
| Cured at 307° F. (minutes): | | | | |
| 20 | 2,985-850 / 215 | 3,440-850 / 310 | 3,925-820 / 270 | 3,605-820 / 365 |
| 30 | 2,980-815 / 215 | 3,440-780 / 400 | 3,065-790 / 315 | 3,310-735 / 460 |
| 45 | 2,925-775 / 315 | 3,360-765 / 490 | 3,115-765 / 420 | 3,285-690 / 620 |
| 75 | 2,955-720 / 435 | 3,210-715 / 590 | 3,080-750 / 420 | 3,445-680 / 735 |

[1] Hot milled for 40 minutes at 310° F.

Dynamic property improvements are obtained by the present invention. One of the important changes is increased resilience. This property is measured in a free vibration apparatus using the modified Yerzley oscillograph, as described in "Rubber Age," vol. 67 (1951), page 51. An internal viscosity-frequency term, $\eta_f$, is thus obtained. It represents the energy loss from damping and is inversely proportional to elasticity or resilience. The dynamic modulus, $K$, may also be calculated from this experiment. For the lowest hysteresis, it is desirable to have the internal viscosity low and the dynamic modulus high, and the ratio of these terms, $K/\eta_f$, yields the percent relative damping. These properties were measured at 50° C. with the present set of vulcanizates cured for 45 minutes at 307° F.

Dynamic property tests on the same samples discussed above are shown in Table III.

Table III.—*Dynamic properties of butyl-Hi Sil compounds before and after hot milling*

| Test No. | No Heat-Treatment | | Heat-Treated [1] | |
|---|---|---|---|---|
| | Standard Hi Sil C 1 | Modified Hi Sil C 2 | Standard Hi Sil C 3 | Modified Hi Sil C 4 |
| $\eta_f \times 10^{-8}$, poises $\times$ c.p.s. | 2.81 | 1.48 | 2.36 | 1.39 |
| $K \times 10^{-7}$, dynes/cm.$^2$ | 8.23 | 6.70 | 7.96 | 6.90 |
| Percent relative damping | 24.0 | 16.2 | 21.2 | 14.9 |

[1] Hot milled for 40 minutes at 310° F.

Table III shows that surface treatment of the pigment produces greatly improved dynamic properties in butyl compounds, and that thermal interaction, with either standard or modified Hi Sil C, has only a small effect. It is noteworthy, however, that in going from the conventional system (first column) to the twice modified system (fourth column), $\eta_f$ is reduced by 50% and the relative damping by almost 40%.

EXAMPLE III

Butyl-Hi Sil compounds may be thermally interacted by static heating in air and Table IV shows data taken from work in which the masterbatches were thermally interacted by heating them for four hours in an oven under air pressure at 80 pounds gauge at 320° F.

Table IV.—*Tensile properties of butyl-Hi Sil compounds before and after static heating*

TENSILE-ELONGATION 300% MODULUS

| Test No. | No Heat-Treatment | | Heat-Treated [1] | |
|---|---|---|---|---|
| | 1 Standard Hi Sil | 2 Modified Hi Sil | 3 Standard Hi Sil | 4 Modified Hi Sil |
| Cured at 307° F. (minutes): | | | | |
| 20 | 2,830–825 / 265 | 3,300–830 / 325 | 3,110–825 / 280 | 3,050–770 / 365 |
| 30 | 2,815–775 / 300 | 3,190–785 / 395 | 3,160–795 / 320 | 3,075–740 / 465 |
| 45 | 2,700–735 / 340 | 2,950–740 / 460 | 2,800–710 / 375 | 3,020–675 / 585 |
| 70 | 2,485–680 / 390 | 2,960–710 / 515 | 2,745–705 / 415 | 3,150–670 / 685 |

[1] Statically heated, 80# air at 320° F. for 4 hours.

In general, these results are similar to those in the drawing and Table II. Except for the change in heat treatment conditions, this work employed the same procedure used in the previous Example II.

As already stated, butyl vulcanizates prepared with non-black fillers are generally characterized by low modulus, and tensile strength is usually low in these compounds. In sharp contrast, one can, with cyclopentadienyl trichlorosilane modified Hi Sil C and thermal interaction, produce non-black butyl stocks with vulcanizate quality very nearly matching that which is normally obtained with channel black. For comparison, the results of Test 4 in Example II, are reproduced herebelow in Table V which lists the tensile and dynamic properties of (1) a typical prior art non-black butyl compound, (2) a butyl compound thermally interacted with surface-treated Hi Sil C, and (3) a butyl compound mixed conventionally with MPC channel black. The near approach to "white carbon black" (columns 2 and 3) is demonstrated in this work.

Table V.—*An approach to "White Carbon Black"*

| Test No. | 1 | 2 | 3 |
|---|---|---|---|
| Filler | Zeolex 20 [1] | Modified Hi Sil C | M.P.C. Black |
| Parts of filler/100 parts of polymer | 80 | 40 | 40 |
| Treatment | None | Heat-treated | None |
| Cured at 307° F. (minutes) | 45 | 45 | 45 |
| Tensile strength, lbs./in.$^2$ | 1,360 | 3,285 | 3,300 |
| 300% modulus, lbs./in.$^2$ | 420 | 620 | 850 |
| Percent elongation | 670 | 690 | 630 |
| $\eta_f \times 10^{-8}$, poises $\times$ c.p.s. | >3.0 | 1.4 | 3.3 |

[1] Sodium aluminosilicate.

It is noteworthy that with Zeolex 20, as with most non-black fillers in butyl, a high concentration of pigment is required to obtain significant values of modulus at 300% extension. Heat-treatment of this composition containing Zeolex produces no improvements in vulcanizate quality.

Though the C.P.D. silane-modified silica is outstanding in its applicability to Butyl rubber, it may be applied, though generally with less beneficial results, to the compounding of natural rubber and various high-unsaturation synthetic rubbers.

Among the high unsaturation rubbers, the invention appears most applicable to the diene-nitrile synthetic rubbers, as shown in the following data.

EXAMPLE IV

HYCAR OR-25 (BUTADIENE-ACRYLONITRILE COPOLYMER RUBBER)

Hycar compounds in this example were prepared according to the formulation given herebelow. Hycar OR-25 is an emulsion copolymer of 75% butadiene and 25% acrylonitrile.

HYCAR FORMULATION

| | | |
|---|---|---|
| Hycar OR-25 | 100.0 | } Masterbatch |
| Filler | 60.0 | |
| Stearic acid | 1.5 | |
| Zinc oxide | 5.0 | } Vulcanizing agents and plasticizers |
| Sulfur | 2.0 | |
| Altax [1] | 1.5 | |
| Tuads [2] | 0.5 | |
| Cumar P-25 [3] | 12.5 | |
| Dibutyl phthalate | 12.5 | |

[1] 2,2'benzothiazyl disulfide.
[2] Tetramethyl thiuram disulfide.
[3] Coumarone-indene polymer.

Vulcanizates were cured for 45 minutes at 287° F. The "Filler" used was Hi Sil C, either standard, or modified by reaction with C.P.D. trichlorosilane as described in Example I.

Table VI summarized the results of stress-strain tests, and demonstrates the reactivity of this acrylonitrile copolymer.

Table VI

|  | No Heat-treatment | | Heat-treated | |
|---|---|---|---|---|
| Test No. | 1 Standard Hi Sil | 2 Modified Hi Sil | 3 Standard Hi Sil | 4 Modified Hi Sil |
| Tensil strength-elongation 300% modulus. | 2,030–510 890 | 1,920–410 1,270 | 1,165–500 1,100 | 2,075–300 2,075 |

The sharp decreases in extensibility accompanying the use of modified Hi Sil C in these systems suggest a process involving bonds strong enough to limit the mobility of the polymer chains. The dual reactivity of Hycar is borne out again in the dynamic properties data given in Table VII.

Table VII.—Dynamic properties of Hycar-Hi Sil compounds

|  | No Heat-treatment | | Heat-treated | |
|---|---|---|---|---|
| Test No. | 1 Standard Hi Sil C | 2 Modified Hi Sil C | 3 Standard Hi Sil C | 4 Modified Hi Sil C |
| $\eta_f \times 10^{-6}$, poises×c.p.s. | 5.13 | 3.29 | 3.00 | 2.42 |
| $K \times 10^{-7}$, dynes/cm.$^2$ | 13.4 | 10.8 | 9.80 | 9.90 |
| Percent relative damping | 26.6 | 21.7 | 21.8 | 17.8 |

Taking the first control (Standard Hi Sil C., no heat-treatment) as a base, reduction in $\eta_f$ may be obtained by using surface treated pigment, either without heat-treatment (column 2), or with heat-treatment (column 4). It is interesting to note further in these systems that, whereas the control vulcanizates are grey in color and opaque, the corresponding vulcanizates after heat-treatment are red amber and translucent.

EXAMPLE V—NEOPRENE

The modulus of neoprene GN vulcanizates is not greatly changed by substituting cyclopentadienyl trichlorosilane modified Hi Sil C for the standard filler but the tensile strength is increased by about 15%. The polymer may be cured in the absence of sulfur and accelerators and for this reason heat-treatment leads only to scorching and premature vulcanization.

EXAMPLE VI

Compounds of butyl with standard and surface treated Hi Sil C were prepared using the following formulation:

FORMULATION OF COMPOUND

| | |
|---|---|
| GR–I–17 | 100.0 } |
| Filler | 40.0 } Masterbatch |
| B×DC [1] | 2.0 } |
| Zinc oxide | 5.0 } |
| Sulfur | 2.0 } |
| Tellurac [2] | 1.0 } Vulcanizing agents |
| B.J.F.[3] | 1.0 } |

[1] Butoxyethyl diglycol carbonate.
[2] Tellurium diethyl dithiocarbamate.
[3] 3-anilinomethyl-2 (3) benzothiazolethione.

Half of the masterbatch was set aside without further treatment. The other half was hot milled for 30 minutes at 310° F. Vulcanizing agents were added finally on a cool mill and the compounds were cured for 60 minutes at 307° F.

Hi Sil C was surface treated with cyclopentadienyl trichlorosilane. Varying amounts of the silane were dissolved in 2-liter portions of n-hexane and these solutions were poured over 200 gram lots of the pigment. The latter were stirred for 2 to 3 hours, after which the solvent was allowed to evaporate off at room temperature. Table VIII gives the physical properties of butyl vulcanizates prepared with the resulting fillers. A control in each series shows the properties which are obtained with standard Hi Sil C. Data are presented for all of the system, both before and after heat-treatment.

Table VIII.—Physical properties of butyl rubber compounds with cyclopentadienyl trichlorosilane modified Hi Sil C

NOT HEAT-TREATED

| Test No. | 1 | 2 | 3 | 4 | 5 |
|---|---|---|---|---|---|
| Weight Percent Cyclopentadienyl Trichlorosilane | 0 | 1 | 3 | 6 | 10 |
| Modulus at, lbs./in.$^2$: | | | | | |
| 100% | 155 | 190 | 200 | 175 | 150 |
| 200% | 220 | 265 | 300 | 275 | 275 |
| 300% | 295 | 375 | 440 | 440 | 460 |
| 400% | 425 | 550 | 670 | 675 | 725 |
| 500% | 650 | 935 | 1,100 | 1,080 | 1,165 |
| 600% | 1,380 | 1,600 | 1,775 | 1,670 | 1,775 |
| 700% | 2,150 | 2,250 | 2,450 | 2,360 | 2,520 |
| Tensile strength, lbs./in.$^2$ | 2,500 | 2,415 | 2,530 | 2,750 | 2,900 |
| Percent elongation | 755 | 715 | 720 | 770 | 770 |
| $\eta_f \times 10^{-6}$, poises×c.p.s. | 4.09 | 3.25 | 2.63 | 1.94 | 1.91 |
| $K \times 10^{-7}$, dynes/cm.$^2$ | 8.95 | 8.30 | 8.33 | 6.78 | 6.30 |
| Percent relative damping | 30.9 | 27.1 | 22.4 | 20.5 | 21.6 |

HEAT-TREATED

| Test No. | 6 | 7 | 8 | 9 | 10 |
|---|---|---|---|---|---|
| Weight Percent Cyclopentadienyl Trichlorosilane | 0 | 1 | 3 | 6 | 10 |
| Modulus at, lbs./in.$^2$: | | | | | |
| 100% | 150 | 170 | 180 | 180 | 165 |
| 200% | 200 | 290 | 350 | 370 | 350 |
| 300% | 310 | 450 | 590 | 675 | 690 |
| 400% | 470 | 725 | 1,000 | 1,150 | 1,225 |
| 500% | 825 | 1,250 | 1,660 | 1,825 | 1,940 |
| 600% | 1,550 | 2,040 | 2,430 | 2,575 | 2,650 |
| 700% | 2,335 | 2,600 | | | |
| Tensile strength, lbs./in.$^2$ | 2,700 | 2,700 | 2,725 | 2,950 | 2,950 |
| Percent elongation | 765 | 710 | 665 | 665 | 665 |
| $\eta_f \times 10^{-6}$, poises×c.p.s. | 2.07 | 2.12 | 1.82 | 1.56 | 1.42 |
| $K \times 10^{-7}$, dynes/cm.$^2$, 50° C. | 6.09 | 6.68 | 6.59 | 6.12 | 5.60 |
| Percent relative damping | 24.0 | 22.5 | 19.9 | 18.5 | 18.4 |

The extension modulus of the vulcanizate is increased as the surface modification of the pigment is carried up to about 6 weight percent of cyclopentadienyl trichlorosilane. Heat-treatment, except in the case of the system with standard Hi Sil C, leads to additional sharp increases in modulus. This response to heat-treatment is a maximum also in the neighborhood of 6% modification on the filler. It is evident from the data in Table I that the damping properties of butyl Hi Sil C systems are greatly improved if the pigment is surface treated with cyclopentadienyl trichlorosilane. $\eta_f$, an inverse resilience term which measures the energy loss from damping (see article by F. P. Baldwin in "Rubber Age," v. 67 (1951), p. 51), is decreased as much as 50%. Heat-treatment brings about a further enhancement of the damping properties, but the response in this case becomes slightly less as the modification on the pigment is increased. It appears to reach a minimum (optimum) with filler containing about 6% of the silane. This is an unexpected result for which no immediate explanation can be given.

If one treats Hi Sil C with cyclopentadienyl tri-iso-propoxysilane, the pigment does not become responsive to heat-treatment as it does when treated with the corresponding halosilane. Likewise, if one treats Hi Sil C with ethyl trichlorosilane, the pigment does not become responsive.

EXAMPLE VII.—USE OF PROMOTER FOR HEAT-TREATMENT

A masterbatch was prepared with butyl containing standard Hi Sil C and Hi Sil C modified with 6 wt. percent of cyclopentadienyl trichlorosilane, respectively. Each masterbatch was split into three portions. No addition was made to the first portion. To the second and third portions, 0.1 and 0.5 of p-quinonedioxime (G.M.F.) were added, respectively (weights taken on 100 of polymer). All portions were then hot milled for 10 minutes at 310° F. Curing agents were added finally and the compounds were vulcanized as already described. Table IX shows the properties which were obtained from the resulting samples.

*Table IX.—Physical properties of standard and modified Hi Sil C compounds heat-treated with quinonedioxime promoter*

|  | Standard Hi Sil C | | | Hi Sil C with 6% Cyclopentadienyl Trichlorosilane | | |
|---|---|---|---|---|---|---|
| Pigment Test No. | 1 | 2 | 3 | 4 | 5 | 6 |
| Parts of p-Quinonedioxime per 100 parts of Polymer | 0 | 0.1 | 0.5 | 0 | 0.1 | 0.5 |
| Modulus at, lbs./in.$^2$: | | | | | | |
| 100% | 135 | 150 | (1) | 180 | 185 | 210 |
| 200% | 200 | 275 | (1) | 370 | 370 | 605 |
| 300% | 300 | 500 | (1) | 675 | 730 | 1,315 |
| 400% | 450 | 855 | (1) | 1,150 | 1,255 | 2,160 |
| 500% | 725 | 1,360 | (1) | 1,825 | 2,000 | 2,900 |
| 600% | 1,330 | 2,030 | (1) | 2,575 | 2,760 |  |
| 700% | 2,130 | 2,675 | (1) |  |  |  |
| Tensile strength, lbs./in.$^2$ | 2,540 | 2,835 | (1) | 2,950 | 3,040 | 2,900 |
| Percent elongation | 765 | 740 |  | 665 | 650 | 50) |
| $\eta \times 10^{-6}$, poises $\times$ c.p.s. | 2.07 |  |  | 1.56 | 1.44 | 0.91 |
| K$\times 10^{-7}$, dynes/cm.$^2$ | 6.09 |  |  | 6.12 | 5.98 | 5.57 |
| Percent relative damping | 24.0 |  |  | 18.5 | 17.5 | 12.3 |

1 Scorched.

Without promoting agent, little or no change in modulus results from the heat-treatment of butyl-standard Hi Sil C systems. Some response is obtained if 0.1 part of quinonedioxime is included in the masterbatch (Table IX). With 0.5 part of the dioxime, the batch scorches in a very few minutes on the hot mill. The band first becomes rough. Then it laces and bags, and finally crumbles so that it can no longer be forced around the mill roll. Compounds with cyclopentadienyl trichlorosilane do not scorch, at least at the quinonedioxime concentrations shown in Table IX. With 0.5 part of the promoting agent, the modulus of the resulting vulcanizate approaches that of a heat-treated channel black tread compound. It has equivalent tensile strength and extensibility, but much lower hysteresis or damping properties. The damping properties of this Hi Sil system are in the same range as those of a good, thermally interacted butyl carcass compound with 35 parts of channel black and plasticized with 12.5 parts of oil. Column one in Table X relists the properties of the cyclopentadienyl trichlorosilane modified Hi Sil C compound heat-treated with 0.5 part of p-quinonedioxime (last column of Table IX.) Columns two and three in Table X list similar properties for a butyl tread (50 parts of channel black and 3 parts of oil) and a butyl carcass (30 parts of channel black and 12.5 parts of oil), respectively. These tire compounds were thermally interacted in the Banbury using Polyac (p-dinitrosobenzene) as the promoting agent. Forum 40, an acid-treated paraffinic petroleum distillate, was the oil employed as plasticizer. It can be seen from the comparison in Table X that it is possible with pigment modification and promoted heat-treatment to prepare from Hi Sil C a butyl compound combining the strength and modulus characteristics of a tread stock, and the resilience or hysteresis characteristics of a carcass stock.

*Table X.—Comparison of Hi Sil C compound with butyl tread and carcass compound*

|  | CPD-TCS Modified Hi Sil C [1] | Channel Black and Oil Plasticizer—Parts of Oil | |
|---|---|---|---|
|  |  | 3 | 12.5 |
| Test No. | 1 | 2 | 3 |
| Modulus at, lbs./in.$^2$: | | | |
| 100% | 210 | 260 | 150 |
| 200% | 605 | 725 | 325 |
| 300% | 1,315 | 1,420 | 680 |
| 400% | 2,160 | 2,135 | 1,150 |
| 500% | 2,900 | 2,750 | 1,730 |
| Tensile strength, lbs./in.$^2$ | 2,900 | 2,750 | 1,935 |
| Percent elongation | 500 | 500 | 500 |
| $\eta \times 10^{-6}$, poises $\times$ c.p.s. | 0.91 | 2.00 | 0.59 |
| K$\times 10^{-7}$, dynes/cm.$^2$ | 5.57 | 6.82 | 4.06 |
| Percent relative damping | 12.3 | 21.0 | 11.0 |

[1] Hi Sil C compound—Test No. 6 in Table IX.

It is not intended that this invention be limited to the specific modifications or examples which have been given merely for the sake of illustration, but only by the appended claims in which it is intended to claim all novelty inherent in the invention of modifications coming within the scope and spirit of the invention.

What is claimed is:

1. As a new product, a mineral pigment consisting of at least partially hydrated silica, reacted with a cycloalkadiene-substituted chlorosilane having the general formula $$R_mSi_nCl_{2n+2-m}$$

in which R is a cycloaliphatic dienyl radical having 5 to 6 carbon atoms in the ring, $m$ equal to 1 to $2n+1$, and $n=1$ to 5.

2. As a new product a hydrated silica reacted with cyclopentadienyl trichlorosilane.

3. Composition comprising 100 parts by weight of rubbery isoolefin-multiolefin copolymer having an iodine number (Wijs) of 0.5 to 50 and homogeneously admixed therewith about 10 to 100 parts by weight of the reaction product of cyclopentadienyl trichlorosilane with hydrated silica.

4. The method of making improved surface-reacted mineral fillers which comprises making a solution of cyclopentadienyl trichlorosilane in n-hexane, using proportions corresponding approximately to 6.8 gms. of the silane and 2 liters of hexane, and then mixing a precipitated hydrated silica of fine particle size therewith, in proportions corresponding approximately to 200 gms. of the silica per 6.8 gms. of said silane, stirring the resulting mixture of silica in the silane-hexane solution intermittently for 2–3 hours, and then evaporating the hexane.

5. The method of making improved mineral pigments which comprises reacting the particles of a mineral pigment selected from the group consisting of oxides of silicon, aluminum and titanium, silicates of aluminum and calcium, carbonates of calcium and magnesium, and hydrated derivatives thereof, with a cyclodiene-substituted chlorosilane, in which said cyclodiene is selected from the group consisting of cycloalkadienes having 5 to 6 carbon atoms in the ring, and lower alkyl derivatives thereof.

6. Method according to claim 5, using about 1 to 15 parts by weight of cyclodiene-substituted chlorosilane per 100 parts by weight of pigment.

7. The method of making improved mineral pigments which comprises reacting the surface of particles of a hydrated silica pigment with about 1 to 15 parts by weight of cyclopentadienyl trichlorosilane per 100 parts of pigment.

8. The method of making improved mineral pigments which comprises reacting the surface of particles of a hydrated alumina pigment with about 1 to 15 parts by weight of cyclopentadienyl trichlorosilane per 100 parts of pigment.

9. As a new product, a mineral pigment selected from the group consisting of oxides of silicon, aluminum and titanium, silicates of aluminum and calcium, carbonates of calcium and magnesium, and hydrated derivatives thereof, the particles of which have been reacted with a cyclodiene-substituted chlorosilane, in which said cyclodiene is selected from the group consisting of cycloalkadienes having 5 to 6 carbon atoms in the ring, and lower alkyl derivatives thereof.

10. Product according to claim 9, using proportions of about 1 to 15 parts by weight of cyclodiene-substituted chlorosilane per 100 parts by weight of pigment.

11. The method of making improved filler-rubber compositions which comprises homogeneously admixing 1 to 150 parts by weight of mineral pigment selected from the group consisting of oxides of silicon, aluminum and titanium, silicates of aluminum and calcium, carbonates of calcium and magnesium, and hydrated derivatives thereof, the particles of which have been reacted with a cyclodiene-substituted chlorosilane, in which said cyclodiene is selected from the group consisting of cycloalkadienes having 5 to 6 carbon atoms in the ring, and lower alkyl derivatives thereof, with 100 parts by weight of an unsaturated vulcanizable rubber selected from the group consisting of natural rubber, butadiene-styrene copolymer synthetic rubber, polychloroprene, butadiene-acrylonitrile copolymer rubber, and olefin-multiolefin copolymer rubber having an iodine number (Wijs) of 0.5 to 50.

12. The method of making improved compositions of isoolefin-multiolefin copolymer rubber and mineral filler, which comprises homogeneously admixing about 10 to 100 parts by weight of hydrated silica pigments, the particles of which have been reacted with a cyclodiene-substituted chlorosilane, in which said cyclodiene is selected from the group consisting of cycloalkadienes having 5 to 6 carbon atoms in the ring, and lower alkyl derivatives thereof, with 100 parts by weight of isoolefin-multiolefin copolymer rubber having an iodine number (Wijs) of 0.5 to 50.

13. Process according to claim 12 followed by subjecting the resulting mixture of reacted silica pigment and isoolefin-multiolefin copolymer rubber to heat treatment at a temperature between about 250 and 450° F. inversely for 8 hrs. to 5 minutes, to promote the formation of bonds between the reacted silica pigment and the isoolefin-multiolefin copolymer rubber.

14. Process according to claim 13 in which said heat treatment is carried out in the presence of a heat-interaction promoter from the group consisting of quinone and nitroso compounds.

15. The method of making improved compositions of isoolefin-multiolefin copolymer rubber and silica pigment which comprises homogeneously admixing about 10 to 100 parts by weight of a hydrated silica pigment, the particles of which have been reacted with about 3 to 10 parts by weight of cyclopentadienyl trichlorosilane per 100 parts of hydrated silica, with 100 parts by weight of isoolefin-multiolefin copolymer rubber having an iodine number (Wijs) of 0.5 to 50, and with about 0.5 part by weight of paraquinone dioxime as a heat interaction promoter, then subjecting the resulting mixture to a heat treatment comprising hot milling the mixture at about 310° F. for about 10 minutes.

16. Composition comprising 100 parts by weight of a material selected from the group consisting of natural rubber, butadiene-styrene copolymer synthetic rubber, polychloroprene, butadiene-acrylonitrile copolymer rubber, and isoolefin-multiolefin copolymer rubber having an iodine number (Wijs) of 0.5 to 50, polystyrene, polyethylene, polyvinyl chloride, and styrene-isobutylene copolymers, and homogeneously admixed therewith about 1 to 150 parts by weight of a mineral pigment selected from the group consisting of oxides of silicon, aluminum and titanium, silicates of aluminum and calcium, carbonates of calcium and magnesium, and hydrated derivatives thereof, the particles of which have been reacted with a cyclodiene-substituted chlorosilane, in which said cyclodiene is selected from the group consisting of cycloalkadienes having 5 to 6 carbon atoms in the ring, and lower alkyl derivatives thereof.

17. The method of making improved vulcanized filler-rubber compositions which comprises homogeneously admixing 1 to 150 parts by weight of mineral pigment selected from the group consisting of oxides of silicon, aluminum and titanium, silicates of aluminum and calcium, carbonates of calcium and magnesium, and hydrated derivatives thereof, the particles of which have been reacted with a cyclodiene-substituted chlorosilane, in which said cyclodiene is selected from the group consisting of cycloalkadienes having 5 to 6 carbon atoms in the ring, and lower alkyl derivatives thereof, with 100 parts by weight of an unsaturated vulcanizable rubber selected from the group consisting of natural rubber, butadiene-styrene copolymer synthetic rubber, polychloroprene, butadiene-acrylonitrile copolymer rubber, and isoolefin-multiolefin copolymer rubber having an iodine number (Wijs) of 0.5 to 50, also admixing therewith vulcanizing amounts of vulcanizing agents, and heating to effect vulcanization.

18. Composition comprising improved filler-rubber vulcanizates of a homogeneous admixture of vulcanizing agents with 100 parts by weight of an unsaturated vulcanizable rubber selected from the group consisting of natural rubber, butadiene-styrene copolymer synthetic rubber, polychloroprene, butadiene-acrylonitrile copolymer rubber, and isoolefin-multiolefin copolymer rubber having an iodine number (Wijs) of 0.5 to 50, and homogeneously admixed therewith about 1 to 150 parts by weight of a mineral pigment selected from the group consisting of oxides of silicon, aluminum and titanium, silicates of aluminum and calcium, carbonates of calcium and magnesium, and hydrated derivatives thereof, the particles of which have been reacted with a cyclodiene-substituted chlorosilane, in which said cyclodiene is selected from the group consisting of cycloalkadienes having 5 to 6 carbon atoms in the ring, and lower alkyl derivatives thereof.

19. Composition comprising improved vulcanizates of isoolefin-multiolefin copolymer rubber and mineral filler, comprising vulcanizates of a homogeneous admixture of vulcanizing agents with 100 parts by weight of isoolefin-multiolefin copolymer rubber having an iodine number (Wijs) of 0.5 to 50, and about 10 to 100 parts by weight of hydrated silica filler the particles of which have been reacted with about 3 to 10 parts by weight of cyclopentadienyl trichlorosilane per 100 parts by weight of hydrated silica.

References Cited in the file of this patent

UNITED STATES PATENTS 2,665,264    Brooks et al.    Jan. 5, 1954
2,667,501    Martin    Jan. 26, 1954